(12) United States Patent
Ameline (10) Patent No.: US 10,101,898 B2
(45) Date of Patent: Oct. 16, 2018

(54) MULTI-TOUCH GRAPHICAL USER INTERFACE FOR INTERACTING WITH MENUS ON A HANDHELD DEVICE

(75) Inventor: Ian Ross Ameline, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 1580 days.

(21) Appl. No.: 12/909,794

(22) Filed: Oct. 21, 2010

(65) Prior Publication Data

US 2011/0099513 A1 Apr. 28, 2011

Related U.S. Application Data

(60) Provisional application No. 61/254,576, filed on Oct. 23, 2009.

(51) Int. Cl.
*G06F 3/0488* (2013.01)

(52) U.S. Cl.
CPC .. *G06F 3/0488* (2013.01); *G06F 2203/04808* (2013.01)

(58) Field of Classification Search
CPC ......... G06F 3/0488; G06F 2203/04808; G06F 3/0482; G06F 3/04842
USPC ........................................ 715/790, 863, 864
See application file for complete search history.

(56) References Cited

U.S. PATENT DOCUMENTS

| | | | |
|---|---|---|---|
| 5,303,388 A * | 4/1994 | Kreitman | G06F 3/04815 715/836 |
| 5,874,959 A * | 2/1999 | Rowe | G06F 3/04842 345/592 |
| 6,208,335 B1 * | 3/2001 | Gordon | H04N 5/44543 348/331 |
| 6,437,774 B1 * | 8/2002 | Tsuji | G06F 1/1601 345/156 |
| 7,158,123 B2 * | 1/2007 | Myers | G06F 3/0421 345/173 |
| 8,159,464 B1 * | 4/2012 | Gribble | G06F 3/038 178/18.01 |
| 8,508,472 B1 * | 8/2013 | Wieder | G06F 3/0304 345/156 |
| 2002/0171682 A1 * | 11/2002 | Frank et al. | 345/790 |
| 2005/0078325 A1 * | 4/2005 | Momose | H04N 1/3872 358/1.9 |
| 2006/0156247 A1 * | 7/2006 | McCormack | G06F 3/0481 715/767 |
| 2006/0190841 A1 * | 8/2006 | Lee | 715/810 |

(Continued)

OTHER PUBLICATIONS

Definition of "substantially" retrieved from [http://www.macmillandictionary.com/us/dictionary/american/substantially] on [Jan. 3, 2016], 2 pages.*

(Continued)

*Primary Examiner* — Amy M Levy
(74) *Attorney, Agent, or Firm* — Artegis Law Group, LLP (57) ABSTRACT

A computer-implemented method for interacting with a graphical user interface (GUI) displayed on a multi-touch surface. The method includes segmenting the GUI into a first portion and a second portion, wherein the first portion and second portion do not overlap, causing an activation area to be displayed that overlaps at least a portion of the GUI, determining that a user input is selecting the activation area based on a first user input and, in response, causing a first GUI menu strip to be displayed that overlaps the second portion of the GUI.

14 Claims, 6 Drawing Sheets

(56) References Cited

U.S. PATENT DOCUMENTS

| | | | |
|---|---|---|---|
| 2007/0003223 A1* | 1/2007 | Armstrong | G11B 19/025 386/217 |
| 2007/0250794 A1* | 10/2007 | Miura et al. | 715/810 |
| 2007/0252822 A1* | 11/2007 | Kim et al. | 345/173 |
| 2008/0036743 A1* | 2/2008 | Westerman | G06F 3/038 345/173 |
| 2008/0163053 A1* | 7/2008 | Hwang et al. | 715/702 |
| 2009/0007012 A1* | 1/2009 | Mandic et al. | 715/810 |
| 2009/0043195 A1* | 2/2009 | Poland | 600/437 |
| 2009/0073114 A1* | 3/2009 | Bay et al. | 345/156 |
| 2009/0225056 A1* | 9/2009 | Canova, Jr. | 345/173 |
| 2009/0228820 A1* | 9/2009 | Kim et al. | 715/769 |
| 2010/0100849 A1* | 4/2010 | Fram | 715/835 |
| 2010/0131880 A1* | 5/2010 | Lee et al. | 715/769 |
| 2010/0169813 A1* | 7/2010 | Chang | 715/767 |
| 2010/0299635 A1* | 11/2010 | Oh et al. | 715/811 |
| 2011/0069016 A1* | 3/2011 | Victor | 715/835 |
| 2011/0093888 A1* | 4/2011 | Araki | H04N 5/44543 725/37 |
| 2011/0109560 A1* | 5/2011 | Carvajal et al. | 345/173 |
| 2011/0209087 A1* | 8/2011 | Guyot-Sionnest | G06F 3/04886 715/799 |
| 2011/0320984 A1* | 12/2011 | Irani | G06F 3/0482 715/841 |
| 2012/0036434 A1* | 2/2012 | Oberstein | 715/702 |
| 2012/0179992 A1* | 7/2012 | Smuga et al. | 715/771 |
| 2013/0208014 A1* | 8/2013 | Fleck | G06K 9/00684 345/672 |

OTHER PUBLICATIONS

Kurtenbach et al. The Design of a GUI Paradigm based on Tablets, Two-hands, and Transparency. CHI 97. Atlanta GA, USA (c) 1997 ACM 0-89791-802-9/97/03. pp. 35-42. (Year: 1997).*

* cited by examiner

MULTI-TOUCH GRAPHICAL USER INTERFACE FOR INTERACTING WITH MENUS ON A HANDHELD DEVICE

CROSS-REFERENCE TO RELATED APPLICATIONS

This application claims benefit of U.S. provisional patent application Ser. No. 61/254,576, filed on Oct. 23, 2009, which is hereby incorporated herein by reference.

BACKGROUND

Field of the Invention

The present invention generally relates to graphical user interfaces and, more specifically, to a multi-touch based graphical user interface for interacting with menus on a handheld device.

Description of the Related Art

A conventional handheld electronic device may include a multi-touch screen that displays graphical data and allows a user to interact with the graphical data. Multi-touch screen devices may display a graphical user interface (GUI) on the multi-touch screen with which the user interacts by touching graphical elements of the GUI displayed on the multi-touch screen. The user may input commands and/or data to various applications that execute on the multi-touch screen device via different GUIs associated with the various applications.

However, multi-touch screen devices are typically small enough to fit in one hand and, consequently, the multi-touch screen is usually correspondingly small. Thus, when the user interacts with a GUI displayed on the multi-touch screen, any data that is also being displayed on the multi-touch screen may be obscured by the various graphical elements of the GUI, such as GUI menus. In this situation, the workflow of the user may be disrupted.

As the foregoing illustrates, what is needed in the art is a more effective way to display, activate and interact GUIs on multi-touch screens.

SUMMARY

One embodiment of the invention provides a computer-implemented method for interacting with a graphical user interface (GUI) displayed on a multi-touch surface. The method includes segmenting the GUI into a first portion and a second portion, wherein the first portion and second portion do not overlap, causing an activation area to be displayed that overlaps at least a portion of the GUI, determining that a user input is selecting the activation area based on a first user input and, in response, causing a first GUI menu strip to be displayed that overlaps the second portion of the GUI.

One advantage of embodiments of the invention is that the input capabilities of the multi-touch surface are significantly expanded as a result of menu strips that are overlaid onto one or more GUI objects.

Another advantage of embodiments of the invention is that the GUI can be easily activated by the non dominant hand holding the device.

BRIEF DESCRIPTION OF THE DRAWINGS

So that the manner in which the above recited features of the present invention can be understood in detail, a more particular description of the present invention, briefly summarized above, may be had by reference to embodiments, some of which are illustrated in the appended drawings. It is to be noted, however, that the appended drawings illustrate only typical embodiments of the present invention and are therefore not to be considered limiting of its scope, for the present invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
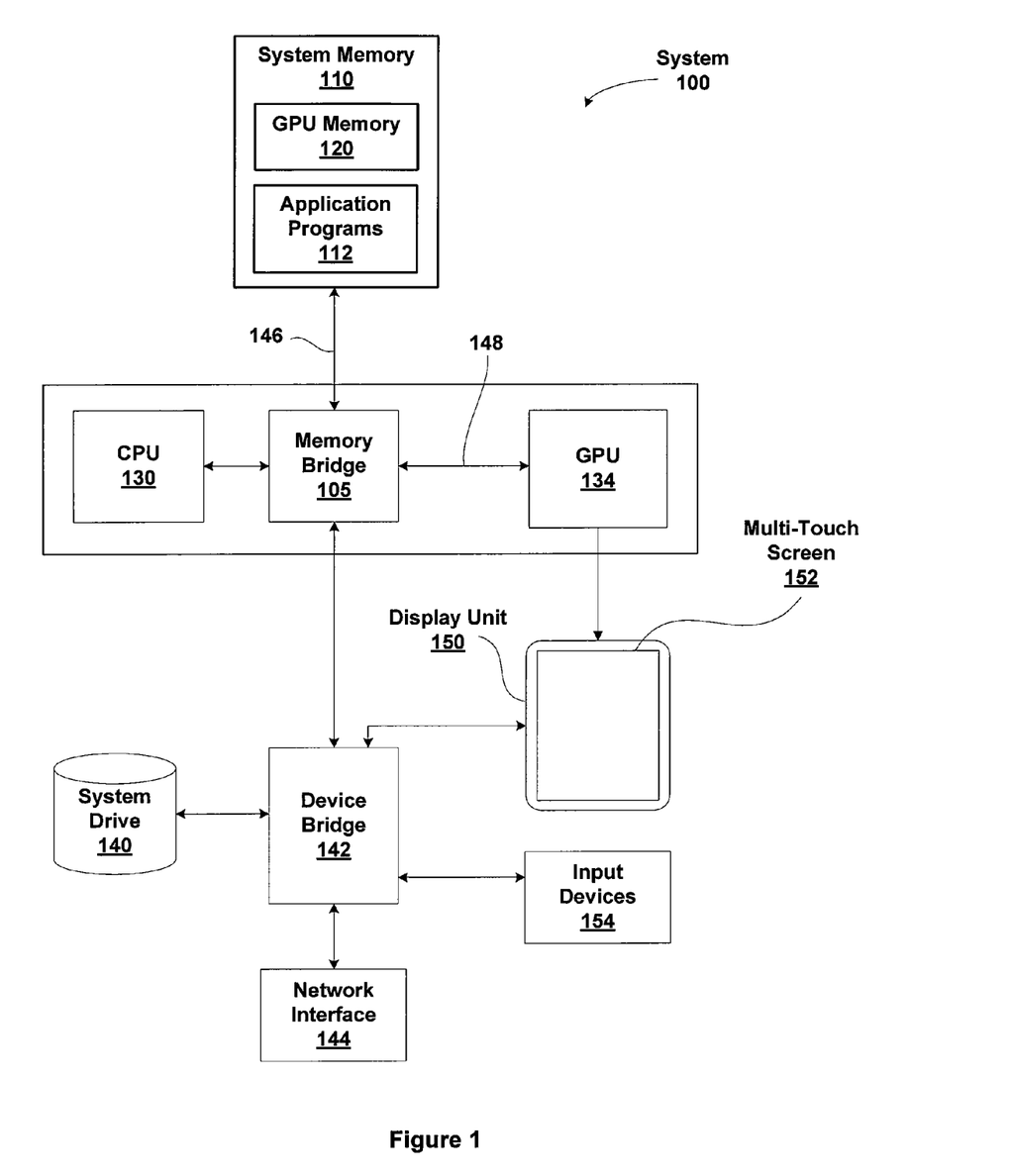
FIG. 1 illustrates a computer system configured to implement one or more aspects of the present invention.

FIG. 1 illustrates a system 100 configured to implement one or more aspects of the present invention. The system 100 includes, without limitation, a central processing unit (CPU) 130, a system memory 110, a graphics processing unit (GPU) 134, a GPU memory 120, a memory bridge 105, a system drive 140, a device bridge 142, a network interface 144, input devices 154, and a display unit 150.

The CPU 130 communicates with the system memory 110 via the memory bridge 105, which may be, e.g., a Northbridge device or subsystem. System memory 110 is configured to store application programs, as well as data used by or generated by the CPU 130. System memory 110 is coupled to the memory bridge 105 via a system memory bus 146. The memory bridge 105 is coupled to the GPU 134 via a GPU system bus 148. The GPU system bus 148 may comprise any technically feasible data interconnect, such as the well-known personal computer interconnect (PCI) express bus. The memory bridge 105 is also coupled to the device bridge 142 using an interconnect system such as PCI. The GPU 134 conventionally incorporates real time image rendering means for rendering both three-dimensional (3D) and two-dimensional (2D) images. The GPU 134 delivers pixel data to display unit 150. The GPU 134 is coupled to the GPU memory 120 included in the system memory 110. The GPU memory 120 may be configured to store data used by or generated by the GPU 134. Data stored within the GPU memory 120 passes through the GPU 134 and the memory bridge 105 when accessed by the CPU 130. In some embodiments, the integrated circuit implementing the CPU 130, the memory bridge 105, and the GPU 134 may be isolated from one another using separate blocks.

The device bridge 142 is coupled to a system drive 140, a network interface 144, input devices 154, and the display unit 150. The system drive 140—which is typically a non-volatile drive (e.g. flash drive)—provides mass storage of programs and data. The network interface 144 provides network connectivity to other computers using a local area network (LAN) interface using any suitable technology, such as an Ethernet or wireless connection. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, Quick Path Interconnect, or any other bus or point-to-point communication protocol(s), and connections between different devices may use different protocols as is known in the art.

The display unit 150 includes a multi-touch screen 152, which may be configured to interpret a capacitive-touch input, camera generated images, or any other technically-feasible technology used for sensing multi-finger and multi-hand inputs. In other embodiments, a multi-touch input device, such as a multi-touch touchpad, is separate from the display unit 150. The multi-touch screen 152 is an input/output device that both displays graphical data and receives input. The multi-touch screen 152 may receive input when contacted by a stylus or the finger of the user, among other things. In one embodiment, the multi-touch screen 152 detects input via a plurality of pressure sensors embedded in the multi-touch screen 152. In another embodiment, the multi-touch screen 152 may detect input via a plurality of capacitors embedded in the multi-touch screen 152. Those skilled in the art will recognize that the multi-touch screen 152 may receive input based on any multi-touch screen related technology. Input received by the multi-touch screen is referred to herein as "touch events," which occur when the user touches the multi-touch screen 152 (e.g., with a stylus or finger). The multi-touch screen 152 may detect any number of separate touch events simultaneously. The multi-touch screen 152 is configured to transmit touch events to the CPU 130, the input devices 154, and/or the system memory 110.

The input devices 154 include various input devices such as microphones, digital cameras, keyboards, and buttons, among others, as well as various output devices, such as speakers, force generators, and light-emitting diodes (LEDs), among others. The input devices 154 are configured to read and/or write data to system memory 110 and receive data from and/or transmit data to CPU 130.

Application programs 112 are stored in the system memory 110 and may be any type of software applications, including word processing applications, computer-aided design (CAD) applications, photo capture applications, photo editing applications, and so forth. The application programs 112 cause the multi-touch screen 152 to display application data associated with the application programs 112 within the multi-touch screen 152. The user may interact with the application programs 112 by touching the multi-touch screen 152 (with a stylus, finger, etc.), thereby causing a touch event to occur. The application program 112 may update the application data based on touch events received from the multi-touch screen 152.

Figure 2A:
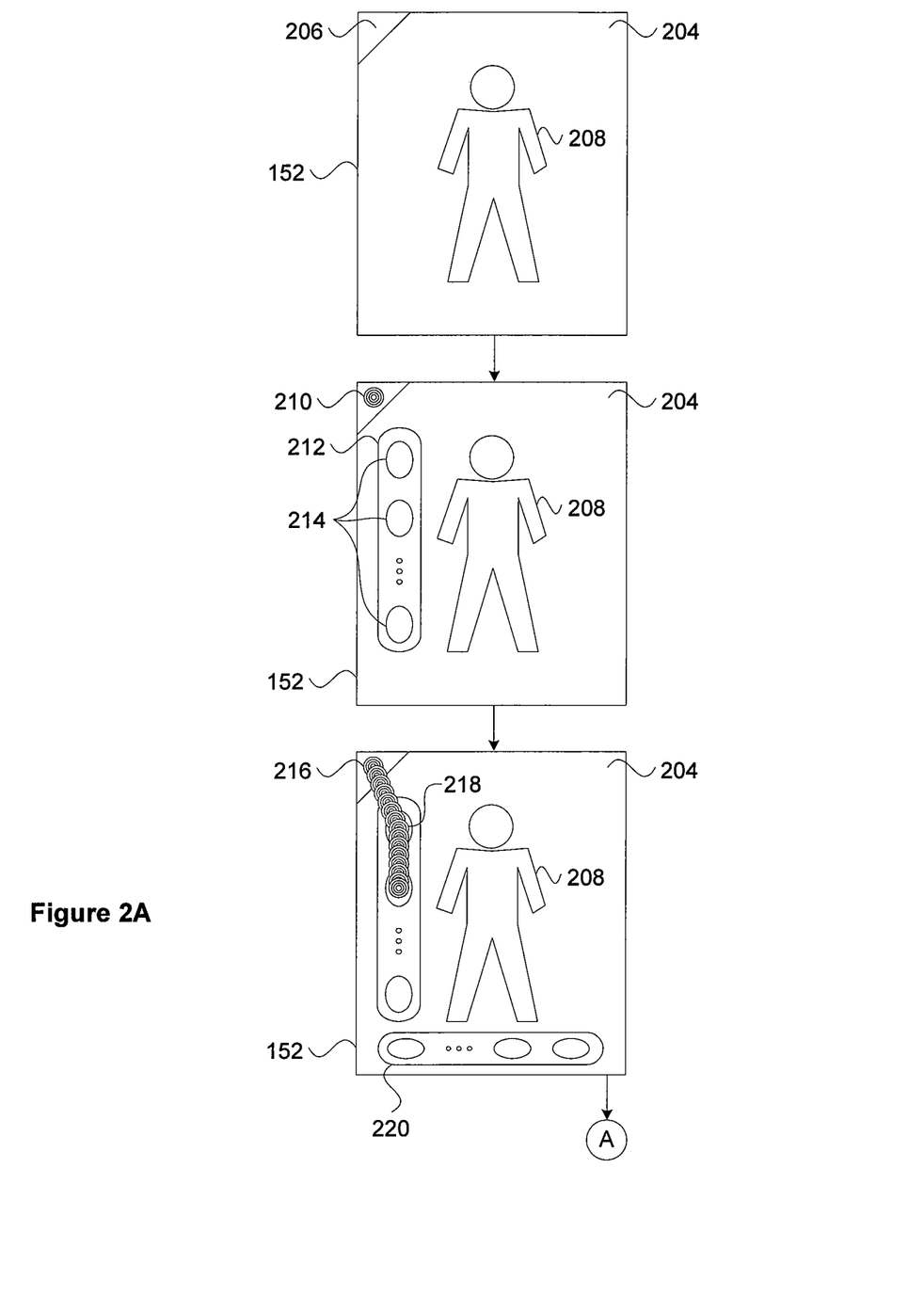
FIGS. 2A-2B depict conceptual diagrams of a technique for establishing and interacting with one or more GUI menu strips, according to various embodiments of the present invention.
Figure 2B:
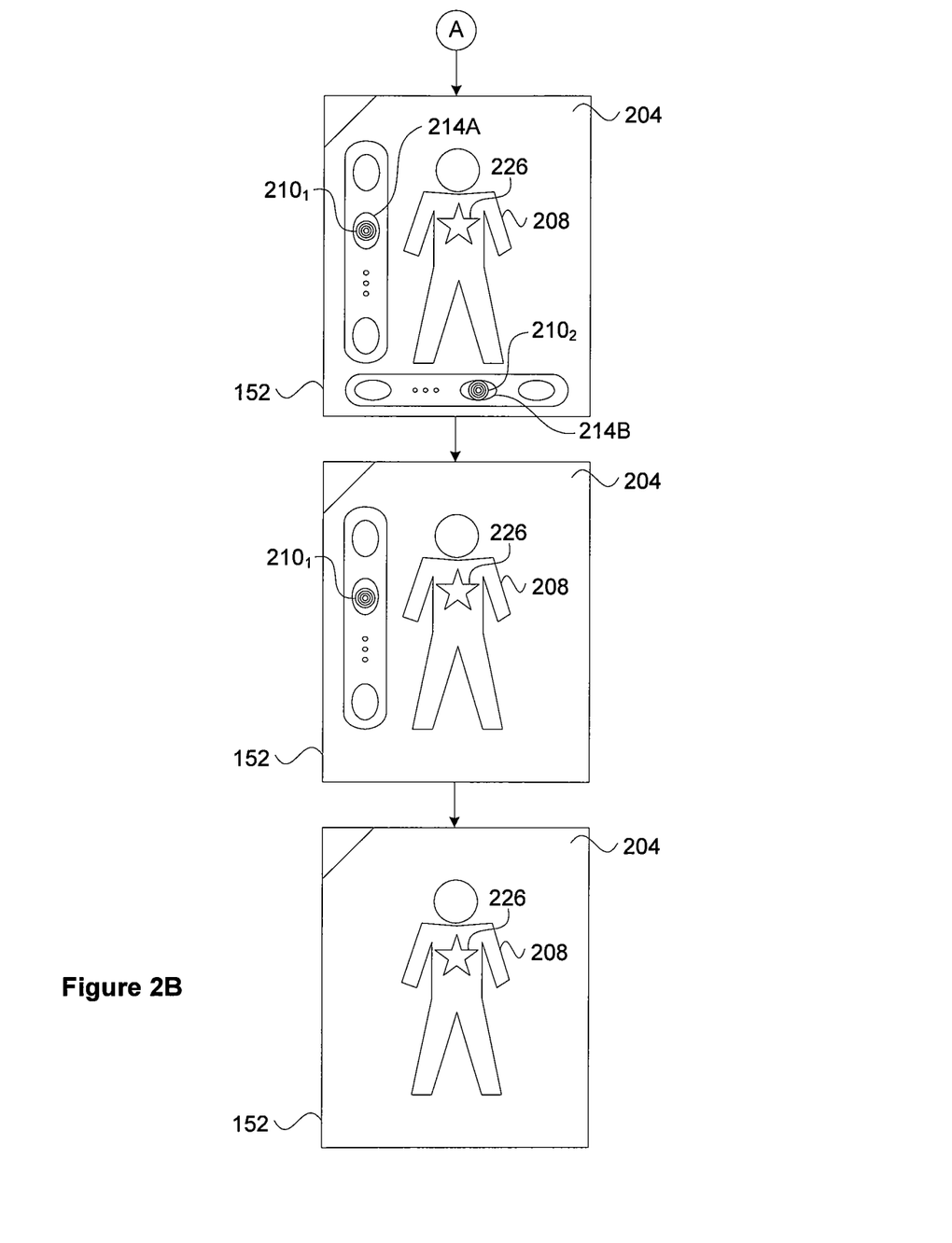

FIGS. 2A-2B depict conceptual diagrams of a technique for establishing and interacting with one or more GUI menu strips, according to various embodiments of the present invention. As shown, the multi-touch screen 152 displays the GUI 204, which includes a GUI element 208. The user may establish touch events through press-and-hold interactions 210 and/or press-and-drag interactions 216, described in further detail below. In one embodiment, the multi-touch screen 152 detects such touch events and routes various input data to any application programs 112 that are configured to receive the touch events. Such input data may include, for example, an (x,y) coordinate pair per point of contact made to the multi-touch screen 152 and/or a pressure measurement per point of contact made to the multi-touch screen 152. With respect to a press-and-drag interaction 216, input data is continually routed to the device bridge 152 so that application programs 112 may track changes to any movement of input made by the user.

As also shown, the GUI 204 includes an activation area 206 which may be used to invoke a GUI menu strip 212. For example, the CPU 130 could be configured to cause the GUI menu strip 212 to be displayed upon determining that the (x,y) coordinate pair of a press-and-hold interaction 210 is within boundaries of the activation area 206, as depicted in FIG. 2A. If the press-and-hold interaction 210 is terminated, then the GUI menu strip 212 is no longer displayed in the GUI 204. In one embodiment, the activation area 206 is configured to lie "over" any GUI elements that are included in the GUI 204, thereby maintaining intuitive accessibility to any user who is unfamiliar with the GUI 204. However, in some embodiments, such a top-most configuration may be obstructive and undesirable to an experienced user. Thus, in another embodiment, the activation area 206 may be semi-translucent thereby enabling underlying elements included in GUI 204 to be partially visible through the activation area 206. In yet another embodiment, the activation area 206 may not be visible to the user at all, but continue to provide the same invocation functionality that is triggered when a press-and-hold interaction 210 is established within borders of the activation area 206.

The GUI menu strip 212 may be configured to display any GUI elements known to those skilled in the art, including text, images, videos, or the like. As shown in FIG. 2A, the GUI menu strip 212 includes one or more GUI menu strip elements 214, with each having their own borders to enable individual selection through a press-and-hold interaction 210 and/or a press-and-drag interaction 216. Further, each of the GUI menu strip elements 214 is configured to, upon selection, cause an associated function to be executed. Examples of a function include, but are not limited to, invoking additional GUI menu strips, as described in further detail below.

In the example depicted in FIG. 2A, the user, upon invoking the GUI menu strip 212 using a press-and-hold interaction 210, advances his or her finger across the GUI and down the multi-touch screen 152, thereby converting the press-and-hold interaction 210 into a press-and-drag interaction 216. Since, in this example, the user maintains physical contact with the multi-touch screen 152, the GUI menu strip 212 remains displayed within the GUI 204 even after the location of the physical contact with the multi-touch screen 152 is outside the boundaries of the activation area 206. As the press-and-drag interaction 216 enters within borders of the GUI menu strip elements 214, the functions associated with the GUI menu strip elements 214 are executed, as described above. In the example shown in FIG. 2A, one GUI menu strip element 214 is associated with a function that causes another GUI menu strip 220 to be displayed. The GUI menu strip 220 is similar to the GUI menu strip 212, but with a different orientation. In one embodiment, the GUI menu strip 220 comprises a lower-level menu relative to the GUI menu strip 212 in a hierarchical menu structure.

FIG. 2B illustrates additional functionality of GUI menu strip items. As shown, the user ends his or her press-and-drag interaction 216 at GUI menu strip element 214A, whereupon the press-and-drag interaction 216 is converted back into a press-and-hold interaction 210, denoted press-and-hold interaction $210_1$. As also shown, the user establishes a second press-and-hold interaction 210, denoted by press-and-hold interaction $210_2$, within boundaries of a GUI menu strip item included in the GUI menu strip 220, i.e., GUI menu strip element 214B. In the example illustrated in FIG. 2B, the GUI menu strip item 214B that is selected by the press-and-hold interaction $210_2$ is associated with a function that causes a GUI element 226 to appear within the GUI element 208. When the user terminates the press-and-hold interaction $210_2$, the GUI menu strip 220 is no longer displayed in the GUI 204. Similarly, when the user terminates the press-and-hold interaction $210_1$, the GUI menu strip 212 is no longer displayed in the GUI 204. The GUI element 208 and the GUI element 226 remain displayed.

The embodiments and various examples described in FIGS. 2A-2B illustrate user operations made to one or more GUI elements displayed within the multi-touch screen 152. The combined use of the activation area 206, the GUI menu strips, and GUI menu strip items enables the user to maintain his or her view of various underlying GUI elements that would otherwise be obstructed when using prior art multi-touch-based GUI techniques.

Figure 3:
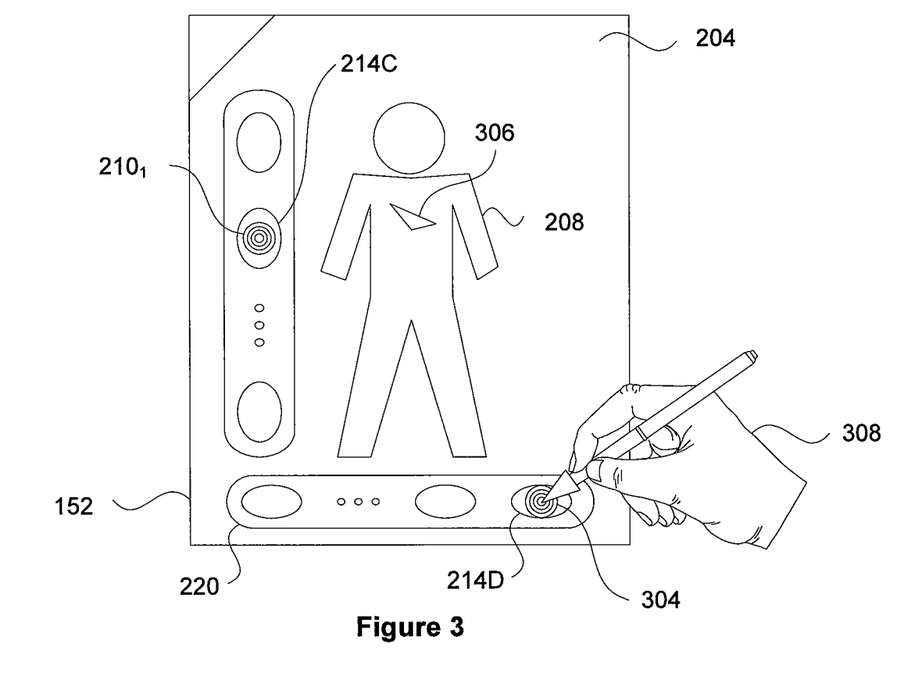
FIG. 3 depicts a conceptual diagram of a technique for establishing and interacting with GUI menu strips using one or more fingers and a stylus, according to one embodiment of the present invention.

FIG. 3 depicts a conceptual diagram of a technique for establishing and interacting with GUI menu strips using one or more fingers and a stylus, according to one embodiment of the present invention. Continuing with the example described above in FIGS. 2A-2B, the user selects a GUI menu strip element 214C that causes the GUI menu strip 220 to be displayed. The user maintains the press-and-hold interaction $210_1$ and, using a stylus 308 articulated by a hand 302 of the user, establishes contact with the multi-touch screen 152. As shown, the location of the contact made by the stylus 308 is within boundaries of GUI menu strip element 214D included in the GUI menu strip 220. This contact causes the GUI menu strip element 214D to be selected, which, in one embodiment, causes a GUI element 306 to be displayed within the GUI 204. In another example, the user could, using two styli in bi-manual interaction, perform the same operation described herein.

Configuring the multi-touch screen 152 to identify stylus-based input allows the size of the GUI menu strips and GUI menu strip elements to be decreased due to the increased input precision capabilities of a stylus compared to that of a finger of the user. The decrease in size may result in an expanded scope of the various underlying GUI elements included in the GUI 204, thereby enhancing the overall experience of the user.

Figure 4A:
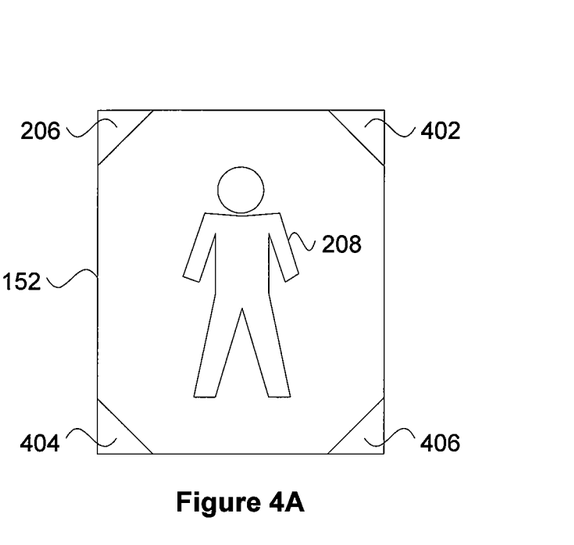
FIGS. 4A-4B depict conceptual diagrams of multiple activation areas, according to various embodiments of the present invention.
Figure 4B:
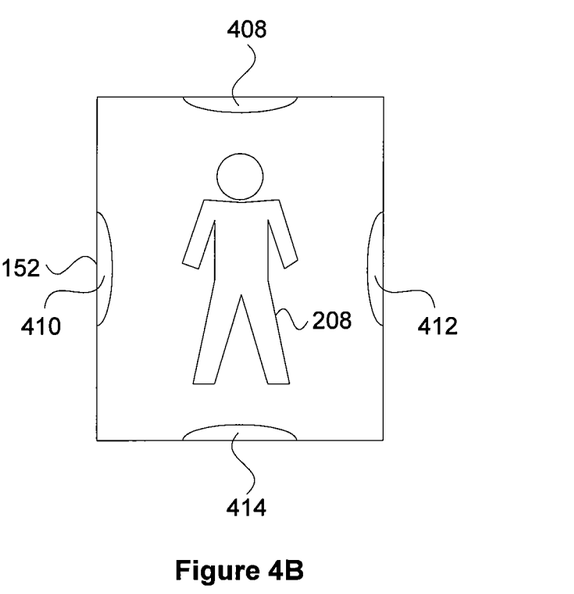

FIGS. 4A-4B depict conceptual diagrams of multiple activation areas, according to various embodiments of the present invention. As shown, the multi-touch screen 152 includes the activation area 206, and also includes additional activation areas 402, 404, and 406. Similar to the GUI menu strip elements described herein, each of the activation areas 402, 404 and 406 may be configured to, upon selection, execute an associated function. In addition, the activation areas described herein are not limited to being located at a corner of the GUI 204 and/or triangular in shape. For example, each of the activation areas may be configured to be of any size, shape, and location within the GUI 204, as illustrated by the activation areas 408, 410, 412 and 414 illustrated in FIG. 4B.

Advantageously, activation areas make it easy for a user to activate, with a hand used to hold the multi-touch screen 152, a GUI menu strip that can be navigated using the opposite hand. For example, if a user is holding multi-touch screen 152 in his or her left hand, and if the activation area is located in the upper left corner of the multi-touch screen 152, then he or she is able to activate a GUI menu strip by simply touching the upper left corner of the multi-touch screen 152 using his or her thumb on the left hand, whereupon he or she can interact with the activated GUI menu strip using, for example, his or her index finger on the right hand.

Figure 5:
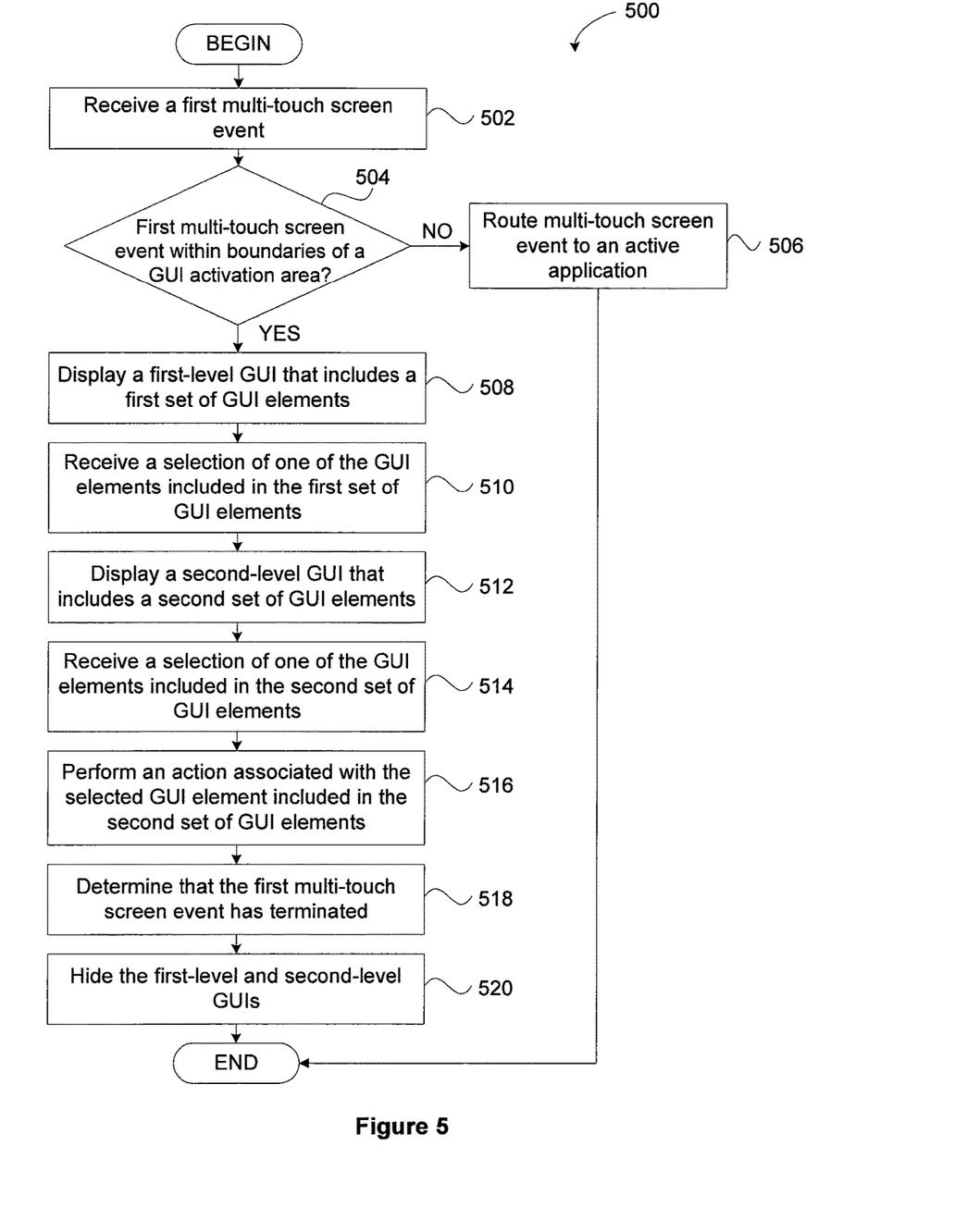
FIG. 5 is a flow diagram of method steps for interacting with various GUI menus and elements using a multi-touch screen, according to one embodiment of the present invention.

FIG. 5 is a flow diagram of method steps for interacting with various GUI menus and elements using a multi-touch screen, according to one embodiment of the present invention. Although the method steps are described in conjunction with the system of FIGS. 1-4B, persons skilled in the art will understand that any system configured to perform the method steps, in any order, is within the scope of embodiments of the present invention.

As shown, the method 500 begins at step 502, where the CPU 130 receives a first multi-touch screen event, such as a press-and-hold interaction 210 or a press-and-drag interaction 216. At step 504, the CPU 130 determines whether the first multi-touch screen event is within boundaries of a GUI activation area. If, at step 504, the CPU 130 determines that the first multi-touch screen event is not within boundaries of a GUI activation area, then the method 500 proceeds to step 506, where the CPU 130 routes the multi-touch screen event to an active application program 112, whereupon the method 500 ends.

Conversely, if the CPU 130 determines that the first multi-touch screen event is within boundaries of a GUI activation area, then the method 500 proceeds to step 508. At step 508, the CPU 130 causes a first level GUI that includes a first set of GUI elements to be displayed, such as the GUI menu strip 212 and the GUI elements 214, respectively. At step 510, the CPU 130 receives a selection of one of the GUI elements included in the first set of GUI elements. As described, the selection may be made with a finger, a stylus, or any other user input mechanism.

At step 512, the CPU 130 causes a second level GUI that includes a second set of GUI elements to be displayed. At step 514, the CPU 130 receives a selection of one of the GUI elements included in the second set of GUI elements. Again, as described, the selection may be made with a finger, a stylus, or any other user input mechanism. At step 516, the CPU 130 performs an action associated with the selected GUI element included in the second set of GUI elements. In one example, the action may comprise causing additional GUI elements to be displayed in the GUI 204.

At step 518, the CPU 130 determines that the first multi-touch screen event has terminated. As previously described, in some embodiments, a user may terminate a multi-touch screen event by eliminating all physical contact with the multi-touch screen 152. In one embodiment, the GUI menu strips described herein are dependent upon one another using parent-child relationships. Specifically, if a parent GUI menu strip is terminated, any child GUI menu strips—along with any GUI menu strips that are children to the child GUI menu strips—are also terminated. Thus, at step 520, since the first multi-touch screen event is terminated, the first GUI menu strip is no longer displayed (i.e., hidden), and the second GUI menu strip is not displayed as well.

In sum, embodiments of the invention related to a GUI displayed on a multi-touch screen associated with a multi-touch screen device. A user may access functionality associated with the GUI, including functionality related to applications executing on the multi-touch screen device and/or functionality associated with additional GUIs, by touching the multi-touch screen at one or more different pre-determined locations. When the user ceases to touch the GUI-activating region of the display screen, the GUI engine correspondingly ceases to display the GUI.

Advantageously, the user of a multi-touch screen device may quickly activate a GUI that allows the user to interact with an application executing on the multi-touch screen device. The user may also deactivate the GUI quickly. Thus, the workflow of the user is not disrupted. In addition, the GUI elements may be displayed in a manner that does not completely cover the underlying application GUI.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A computer-implemented method for interacting with a graphical user interface (GUI) displayed on a multi-touch surface, the method comprising:
   segmenting the GUI into a first portion and a second portion, wherein the first portion and second portion do not overlap;
   defining a menu activation area that overlaps the first portion, wherein the menu activation area is not visible to a user of the GUI, and at least one edge of the menu activation area comprises an outside edge of the GUI;
   detecting a first physical user input starting in the menu activation area, wherein the first physical input comprises a long press;
   causing a first GUI menu strip to be displayed that overlaps the second portion of the GUI and does not overlap the menu activation area, wherein the first GUI menu strip is only displayed when the first physical user input is detected starting in the menu activation area, and the first GUI menu strip includes one or more menu items, each of the one or more menu items being associated with a different function, the different function being executed when the menu item is selected;
   detecting a second physical user input selecting a first menu item of the one or more menu items while the first physical user input is detected;
   executing a first function associated with the selected first menu item;
   detecting the first physical user input ending; and
   removing the first GUI menu strip.

2. The method of claim 1, wherein a first graphics object resides within the second portion of the GUI, and the first GUI menu strip covers at least a portion of the first graphics object such that the at least a portion of the first graphics object is not visible to the user.

3. The method of claim 1, wherein a first graphics object resides within the first portion of the GUI, and the menu activation area corresponds to at least a portion of the first graphics object.

4. The method of claim 1, wherein executing the first function comprises causing a second GUI menu strip to be displayed that overlaps the second portion of the GUI.

5. The method of claim 4, wherein the second GUI menu strip includes one or more menu items, and each menu item is associated with a different function, the different function being executed when the menu item is selected.

6. The method of claim 1, wherein the first physical user input comprises a first physical selection on the multi-touch surface with a first finger or a first stylus, and the second physical user input comprises a second physical selection on the multi-touch surface with a second finger or a second stylus.

7. A non-transitory computer-readable storage medium storing instructions that, when executed by a processor, cause a computing device to interact with a multi-touch surface that displays a graphical user interface (GUI), by performing the steps of:
   segmenting the GUI into a first portion and a second portion, wherein the first portion and second portion do not overlap;
   defining a menu activation area that overlaps the first portion, wherein the menu activation area is not visible to a user of the GUI, and at least one edge of the menu activation area comprises an outside edge of the GUI;
   detecting a first physical user input starting in the menu activation area, wherein the first physical input comprises a long press;
   causing a first GUI menu strip to be displayed that overlaps the second portion of the GUI and does not overlap the menu activation area, wherein the first GUI menu strip is only displayed when the first physical user input is detected starting in the menu activation area, and the first GUI menu strip includes one or more menu items, each of the one or more menu items being associated with a different function, the different function being executed when the menu item is selected;
   detecting a second physical user input selecting a first menu item of the one or more menu items while the first physical user input is detected;
   executing a first function associated with the selected first menu item;
   detecting the first physical user input ending; and
   removing the first GUI menu strip.

8. The non-transitory computer-readable storage medium of claim 7, wherein a first graphics object resides within the second portion of the GUI, and the first GUI menu strip covers at least a portion of the first graphics object such that the at least a portion of the first graphics object is not visible to the user.

9. The non-transitory computer-readable storage medium of claim 7, wherein a first graphics object resides within the first portion of the GUI, and the menu activation area corresponds to at least a portion of the first graphics object.

10. The non-transitory computer-readable storage medium of claim 7, wherein executing the first function comprises causing a second GUI menu strip to be displayed that overlaps the second portion of the GUI.

11. The non-transitory computer-readable storage medium of claim 10, wherein the second GUI menu strip includes one or more menu items, and each menu item is associated with a different function, the different function being executed when the menu item is selected.

12. The non-transitory computer-readable storage medium of claim 7, wherein the first physical user input comprises a first physical selection on the multi-touch surface with a first finger or a first stylus, and the second physical user input comprises a second physical selection on the multi-touch surface with a second finger or a second stylus.

13. A computer system, comprising:
  a processor; and
  a memory storing instructions that, when executed by the processor, cause the computer system to interact with a multi-touch screen that displays graphical user interface (GUI), by performing the steps of:
    segmenting the GUI into a first portion and a second portion, wherein the first portion and second portion do not overlap;
    defining a menu activation area that overlaps the first portion wherein the menu activation area is not visible to a user of the GUI, and at least one edge of the menu activation area comprises an outside edge of the GUI;
    detecting a first physical user input the menu activation area, wherein the first physical input comprises a long press;
    causing a first GUI menu strip to be displayed that overlaps the second portion of the GUI and does not overlap the menu activation area, wherein the first GUI menu strip is only displayed when the first physical user input is detected starting in the menu activation area and the first GUI menu strip includes one or more menu items, each of the one or more menu items being associated with a different function, the different function being executed when the menu item is selected;
    detecting a second physical user input is selecting a first menu item of the one or more menu items while the first physical user input is detected;
    executing a first function associated with the selected first menu item;
    detecting the first physical user input ending; and
    removing the first GUI menu strip.

14. The computer system of claim 13, wherein a first graphics object resides within the second portion of the GUI, and the first GUI menu strip covers at least a portion of the first graphics object such that the at least a portion of the first graphics object is not visible to the user.

\* \* \* \* \*